Aug. 23, 1960
J. H. SMITH ET AL
2,950,445
TRANSISTOR FREQUENCY STANDARD
Filed Aug. 31, 1955
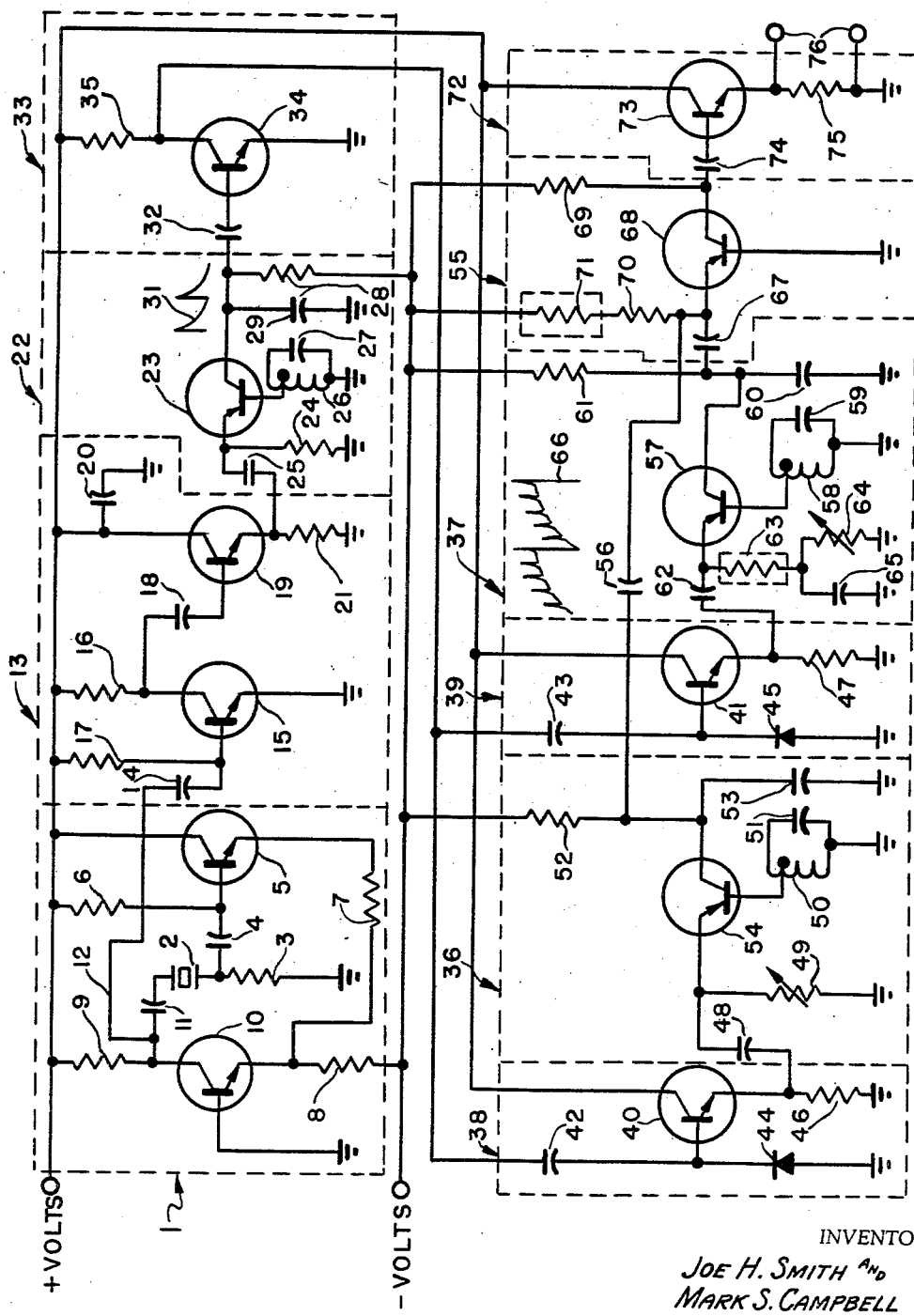
INVENTORS
JOE H. SMITH AND
MARK S. CAMPBELL
BY *Stevens, Davis, Miller & Miller*
ATTORNEYS

United States Patent Office 2,950,445
Patented Aug. 23, 1960

2,950,445

TRANSISTOR FREQUENCY STANDARD

Joe H. Smith and Mark S. Campbell, Dallas, Tex., assignors to Texas Instruments Incorporated, Dallas, Tex., a corporation of Delaware Filed Aug. 31, 1955, Ser. No. 531,719

2 Claims. (Cl. 331—37)

This invention relates to standard frequency generators and more particularly to a transistor oscillator circuit producing accurate low frequency pulses for precision timing of a sequence of events.

Many modern scientific investigation procedures require precise timing of various phenomena. One such investigation procedure is the commonly used seismic method of oil exploration. In this method, the subsurface structure of the earth is determined by creating a disturbance in the earth, usually by a subsurface explosion and detecting, at several accurately known locations, the shock waves produced by the disturbance. The detected shock waves are then transmitted, as electrical signals, to a central location where they are recorded in a side-by-side relationship on the same record for purposes of comparison. For the accurate interpretation of these records, it is essential that precise timing indications be marked on the record. Accuracy to one part in ten thousand is the usual requisite for such timing lines. Because it has been found economically unfeasible to manufacture, in the quantities needed, crystal or tuning fork controlled timing line generators which are capable of such accuracy through several years of hard use in the field, the usual practice is to compromise between cost and accuracy-dependability in the design and manufacture of such devices. Consequently, it has been necessary to subject timing generators in field use to periodic accuracy tests by comparison with an extremely accurate and stable standard frequency generator.

One such standard frequency generator generally in use at the present time is a reasonably small tuning fork controlled unit operating from 110 volt, 60 cycle power. These standard units are usually tested for accuracy at some centralized laboratory location and then sent to a field operation to be used in a comparison test with the particular timing line generator used in that field operation. The standard generator is then returned to the laboratory where it is again tested to determine if its accuracy had been impaired in transit. The standard is next shipped to another field installation for comparison tests of the timing line generator at that installation.

The transistor frequency standard of the present invention is a portable, low voltage, battery operated unit using a crystal controlled oscillator and transistor divided circuits to achieve a low frequency output signal of the accuracy required.

It is one object of the present invention to provide a standard frequency oscillator which is accurate to one part in ten thousand when operating in ambient temperatures over the range of from −40° F. to +140° F.

It is another object of the present invention to provide a standard frequency oscillator for testing the accuracy of timing indication generators which has a much better long-time stability and is much smaller than presently used portable frequency standards.

It is still another object of the present invention to provide a small, light-weight, battery operated frequency standard which is less susceptible to inaccuracies due to dough handling and abusive treatment than other portable frequency standards presently available.

It is a further object of the present invention to provide a portable frequency standard device which is much smaller and less expensive than presently available frequency standards of comparable accuracy.

Other objects and advantages of the frequency standard of the present invention will become apparent from the following detailed description when read in conjunction with the accompanying drawing in which the single figure is a schematic diagram depicting the preferred embodiment of the electrical circuitry for the standard frequency generator of the present invention.

Referring now to the drawing, the dashed-line section of the diagram designated generally by the numeral 1 is the primary frequency oscillator section of the standard frequency generator. The primary frequency of the device is set and governed by the natural frequency of the crystal 2. In the preferred embodiment illustrated, the crystal 2 is a low activity crystal exhibiting high Q, high series resonant resistance and frequency deviation of ±0.010% over a temperature range of −40° C. to +70° C. when operating at a frequency of eight kilocycles per second. Such a crystal is the type 3–J audio frequency crystal manufactured by the Hill Electronic Engineering and Manufacturing Company, Incorporated of New Kingston, Pennsylvania. It will be appreciated that the invention herein described is by no means limited to the use of the above mentioned crystal but that other suitable types may equally well be used to perform the same function.

In the oscillator circuit, the crystal has one terminal connected through the resistor 3 to ground and also through the coupling capacitor 4 to the base of the transistor 5. The base of the transistor 5 is connected through the bias resistor 6 to B+ voltage and its collector is tied directly to B+ voltage. The emitter of transistor 5 is connected to B− voltage through the resistors 7 and 8. The grounded base transistor 10 has its collector connected to B+ voltage through the resistor 9 and is coupled to the output of transistor 5 by the connection of its emitter to the resistor 8. Thus, when power is applied to the circuit, the initial pulse causes the crystal 2 to begin oscillation. The oscillation signal from the crystal is fed through the transistor 5 and coupled to the transistor 10 through their common resistor 8. The signal current is amplified, without phase reversal, by the transistor 10 and applied through the coupling capacitor 11 to the crystal to sustain oscillations of the crystal. Both transistors of the circuit are considerably overdriven with the result that the output from the collector of the transistor 10 is essentially a square-wave and the output power is much in excess of that needed to sustain oscillations of the crystal. Thus, a useful output signal can also be taken from the collector of transistor 10 and fed through line 12 to the pulse amplifier designated generally as 13.

The square-wave output signal from the oscillator section 1 is fed through the coupling capacitor 14 to the base of the grounded emitter transistor 15 in the pulse amplifier 13. The collector of the transistor 15 is connected to B+ voltage through the resistor 16 and its base is connected through the bias resistor 17 to B+ voltage. The coupling capacitor 14 and the resistor 17 also act as a network to differentiate the square-wave signal from the oscillator section 1 so that the actual signal on the base of transistor 15 is a series of sharp pulses at the oscillator frequency. As stated above, for the specific embodiment of the present invention here illustrated, this frequency is eight kilocycles per second. These pulses are amplified and inverted by transistor 15 and fed through the coupling capacitor 18 to the base of transistor 19. The collector of transistor 19 is tied directly to B+ voltage. The load resistor 21 of the transistor 19 is connected between the emitter and ground. This circuit, which is the transistor equivalent of the vacuum-tube cathode follower circuit well-known in the electronics art, is used as the driver supplying the necessary power to the first divider circuit 22. The capacitor 20, shown at this particular point merely for convenience, serves as the bypass capacitor for the B+ voltage.

In the first divider circuit 22, the transistor 23 has its emitter connected through the resistor 24 to ground and through the capacitor 25 to the emitter of transistor 19 from which it receives its input signal. The base of transistor 23 is connected to ground through the resonant circuit comprised of the inductance 26 and the capacitor 27. The collector of transistor 23 is connected to B− voltage through the resistor 28 and is coupled to ground through the capacitor 29. Again with reference only to the particular embodiment shown, it is desired that this circuit divide the frequency of the input pulse by four. To achieve this result, the circuits of the collector and base are both tuned to the desired output frequency.

The tuning of the collector is accomplished by choosing the values of the resistance 28 and the capacitance 29 such that their time constant is slightly greater than the period of the desired output frequency, which for this divider is one-fourth the input frequency or two kilocycles. By this means, there is produced on the collector an exponentially increasing negative bias voltage approaching, at its peak, the value of collector bias voltage at which the transistor will exhibit a negative resistance between its base and collector. Because of the selected time constant of resistor 28 and capacitor 29, every fourth input pulse on the emitter occurs when the collector bias is somewhere near its peak. This input pulse on the emitter, occurring at a time when the collector bias voltage has driven the transistor toward its negative resistance region, will drive the transistor sharply into the negative resistance region. The capacitor 29 will then quickly discharge through the collector to base negative resistance of the transistor and the collector bias will be reduced to a value well below the point at which negative resistance in the transistor occurs. When the transistor is driven out of its negative resistance region, the capacitor 29 again recharges through the resistor 28 and the action is repeated. Two cycles of this collector circuit voltage waveform are shown at 31.

In the base circuit, the inductance 26 and the capacitance 27 form a tank circuit resonant at the desired output frequency and producing a sine wave of voltage on the base of transistor 23. The base circuit receives its energy from the pulse produced when the collector capacitor 29 is discharged and will oscillate with its negative peak voltage coinciding with every fourth positive pulse on the emitter. Since a negative voltage on the base of the transistor has the same effect as a positive voltage on the emitter, the effect of the coincident occurrence of the positive peak on the emitter and the negative peak on the base is to produce a very positive trigger action to drive the transistor into its negative resistance region thus providing an extremely high degree of stability in the divider.

The output pulses from the divider 22 are fed through coupling capacitor 32 to the base of the pulse amplifier 33, transistor 34, which has its emitter grounded and its collector connected to B+ voltage through the load resistor 35. The amplified pulses from the collector of transistor 34 are then fed to two divider circuits 36 and 37 simultaneously through their respective driver circuits 38 and 39. These two driver circuits are identical and both receive the input pulse from the amplifier 33 on the base of their transistors 40 and 41 through the coupling capacitors 42 and 43 respectively. Because the divider 22 presents a radically different load to the grounded emitter pulse amplifier 33 when it switches, a variation in pulse height will appear at the amplifier 33 input. This variation will also appear at the input and the output of both drivers 38 and 39 since they are both fed from the amplifier circuit 33. Such variation may cause unreliable frequency division by the dividers 36 and 37. Therefore, diode clippers 44 and 45 have been placed across the inputs of the two dividers to limit and equalize the pulse height. The drivers 40 and 41 have their collectors connected to the source of B+ voltage and their emitters connected to ground through their respective load resistors 46 and 47. The action of the drivers 38 and 39 is identical to that of the previously discussed driver circuit of transistor 19 and therefore, no further explanation is believed necessary.

The transistor 54 of the divider 36 receives input pulses on its emitter through the capacitor 48 at the output frequency of divider 22, that is, two thousand cycles per second in the illustrated embodiment. With the emitter of transistor 54 connected to ground through the variable resistance 49, the base connected to ground through the resonant circuit comprised of inductance 50 and capacitance 51 and the collector tied to B− voltage through resistor 52 and coupled to ground through capacitor 53, the circuit of divider 36 is exactly the same as that of the divider 22 with the exception that the resistor 49 is made variable in order that slight bias adjustments can be made to allow the interchangeable use of transistors having slightly different characteristics. This variable bias was found desirable to improve the stability of the circuit when operating at frequencies as low as required of the divider 36. In the illustrated embodiment, the divider 36 produces at its output pulses at one-fourth the frequency of the received pulses or five hundred cycles per second through action identical to the action of the divider 22. These output pulses taken from the collector of transistor 54, are fed to the mixer circuit 55 through the coupling capacitor 56.

As stated above, the driver 39 for the divider 37 receives pulses from the same source, amplifier 33, as does the driver 38 for the divider 36. The divider 37, however, divides these pulses by five instead of four. It is basically the same circuit as the divider 36 but has incorporated in it an additional feature to provide even greater stability at its operating frequency which is lower than that of either divider 36 or divider 22. As in the dividers 22 and 36, the base of the transistor 57 in the divider 37 is connected to ground through a circuit comprised of the inductance 58 and the capacitance 59 resonant at the desired output frequency. The collector of transistor 57 is coupled to ground through the capacitor 60 and to B− voltage through the resistor 61. The values of resistance 61 and capacitance 60 are chosen such that their time constant is approximately equal to the period of the desired frequency output.

The signal from the emitter of transistor 41 is fed to the emitter of transistor 57 through the coupling capacitor 62. Also connected to the emitter of transistor 57 is a charging and bias circuit comprised of resistance 63, resistance 64 and capacitance 65. Self-bias is applied to the transistor 57 emitter by the series connection of resistances 63 and 64 between the emitter and ground. In order to provide the temperature stability necessary in this low frequency circuit, resistance 63 is a resistor having a high negative temperature coefficient of resistance. Such resistors are commonly called thermistors and are well-known in the electronics art. Unlike most ordinary resistors whose resistance increases with an increase in temperature, thermistors exhibit a decrease in resistance with an increase in temperature. Thus, the changes in the internal equivalent resistances of the transistor 57 due to changes in the ambient temperature are compensated for by changes in the bias current effected by the inverse change in resistance of the thermistor with the ambient temperature change. To provide even greater stability and allow use of transistor types having a fairly wide range of characteristics in this circuit, the resistor 64, like the resistor 49 of the divider 36, is made variable.

The combination of resistance 64 and capacitor 65 forms a charging circuit which acts in much the same manner as the charging circuit of resistor 61 and capacitor 60 in the collector circuit of transistor 57. As the condenser 65 charges it produces a slow exponential increase in the bias voltage on the emitter of transistor 57 which, together with the exponentially increasing bias on the collector produced by capacitance 60 and resistance 61 drives the transistor very close to its negative resistance region. The values of resistance 64 and capacitance 65 are chosen such that the time constant of the circuit is just slightly greater than the period of the desired output frequency, which for this particular embodiment is four hundred cycles per second. Thus, with the incoming pulses from the divider 22 superimposed on the saw-tooth voltage generated by the charging circuit, every fifth pulse will drive the transistor into its negative resistance region and the capacitor 65 will be discharged rapidly through emitter-to-base negative resistance of the transistor. Two cycles of this voltage waveform on the emitter of transistor 57 are illustrated at 66. The frequency of the output pulse from the collector of transistor 57 is then one-fifth the frequency of the input pulses. These output pulses are fed through the coupling capacitor 67 to the same mixer circuit 55 also receiving the output pulses from divider 36 through the capacitor 56.

The mixer circuit 55 is of the type known as a coincidence mixer. The base of the mixer transistor 68 is connected directly to ground and the collector of transistor 68 is connected to B— voltage through the resistor 69. The transistor 68 is biased below cutoff by connection of its emitter to B— voltage through the resistors 70 and 71. The exact bias potential required will depend upon the amplitude of the incoming pulses from the dividers 36 and 37 because the bias potential must be such that the pulses from either divider 36 or 37 alone will not drive the transistor into its conductive region but coincident occurrence of both pulses will cause the transistor to conduct. Thus, for the embodiment used herein for illustration, with input pulses from divider 36 at a frequency of five hundred cycles per second and input pulses from divider 37 at a frequency of four hundred cycles per second, the pulses on the emitter of transistor 68 are coincident at their difference frequency or one hundred cycles per second and the output of the circuit will be pulses at that frequency. In order for the bias on the emitter of transistor 68 to remain such that the transistor will not conduct unless the two incoming pulses occur simultaneously over a wide range of temperatures the bias resistor 71, like resistor 63, is a thermistor having a high negative thermal coefficient of resistance.

Through such a mixer circuit, the use of a divider circuit of the same type as dividers 22, 36, and 37 to obtain the desired output frequencies can be avoided. Such divider circuits are undesirable for use at this point in the system because they are extremely unstable at low frequencies and especially at frequencies below two hundred and fifty cycles per second.

The final stage of the standard frequency generator is the output circuit 72 consisting of the transistor 73, the capacitor 74 and the resistor 75. Signal pulses from the mixer 55 are fed through the coupling capacitor 74 to the base of the transistor 73 which has its collector connected directly to B+ voltage and its emitter connected to ground through the load resistor 75. This circuit is the transistor equivalent of the vacuum-tube cathode follower circuit and is now well-known in the electronics art. It is quite often used as an impedance matching output circuit. The standard frequency output signal, which is at a frequency of one hundred cycles per second for the particular embodiment described, is taken across the load resistor 75 of the final stage 72 at the terminals 76.

Thus, there has been described a standard frequency generator capable of producing an output frequency accurate to one part in ten thousand over an operating temperature range of from —40° F. to +140° F. which has the advantages of being portable, compact, battery-operated and relatively inexpensive.

Although only the preferred embodiment has been illustrated, many changes, substitutions, and alterations still within the spirit and scope of the standard frequency generator of the present invention will be apparent to those skilled in the art. It is therefore intended that this invention be limited only as set forth in the appended claims.

What is claimed is:
1. A transistorized standard low frequency generator comprising an oscillator stage, a first divider stage receiving signals from said oscillator stage and producing signals of a sub-multiple frequency of said received signals, a second divider stage receiving signals from said first divider stage and producing signals of a sub-multiple frequency of the signals from said first divider stage, a third divider stage receiving signals from said first divider stage and producing signals of a sub-multiple frequency of the signals received from said first divider stage and different from the frequency of the signals produced by said second divider stage, and a coincidence mixer stage receiving signals from said second divider stage and said third divider stage and producing only a signal of a frequency equal to the difference between the frequency of the signals from the said second divider stage and the frequency of the signals from said third divider stage.

2. A transistorized standard low frequency generator comprising an oscillator stage, a first-amplifier stage receiving and amplifying signals from said oscillator stage, a first driver stage receiving said amplifier signals, a first divider stage receiving signals from said first driver stage and producing signals at a sub-multiple frequency of said received signals, a second amplifier stage receiving and amplifying signals from said first divider stage, a second driver stage receiving signals from said second amplifier stage, a second divider stage receiving signals from said second driver stage and producing signals at a sub-multiple frequency of the signals from said first divider stage, a third driver stage arranged to receive signals from said second amplifier stage, a third divider stage receiving signals from said third driver stage and producing signals of a sub-multiple frequency of the signals from said first divider stage and different from the frequency of the signals produced by said second divider stage, a coincidence mixer stage receiving signals from said second and third divider stages and producing only a signal of a frequency equal to the difference between the frequency of the signals produced by the said second divider stage and the frequency of the signals produced by said third divider stage, and an output stage receiving the signals from said coincidence mixer stage and applying said received signals to output terminals.

References Cited in the file of this patent

UNITED STATES PATENTS

| 1,874,845 | Albersheim | Aug. 30, 1932 |
| 2,235,019 | Johannson | Mar. 18, 1941 |
| 2,258,943 | Bedford | Oct. 14, 1941 |
| 2,383,005 | Marks | Aug. 21, 1945 |
| 2,451,021 | Detuno | Oct. 12, 1948 |
| 2,602,140 | Fink | July 1, 1952 |

FOREIGN PATENTS

| 510,881 | Great Britain | Aug. 8, 1939 |
| 676,714 | Great Britain | July 30, 1952 |